(12) United States Patent
Steinberg et al.

(10) Patent No.: US 9,811,350 B2
(45) Date of Patent: Nov. 7, 2017

(54) EMBEDDING NON-BLOCKING HELP COMPONENTS IN A DISPLAY PAGE USING DISCOVERY DRAWER FEATURE CUES

(75) Inventors: Carol Steinberg, Sierra Madre, CA (US); John Lindal, La Canada, CA (US); Dave Owen, Burbank, CA (US)

(73) Assignee: Excahbur IP, LLC, New York, NY (US)

( * ) Notice: Subject to any disclaimer, the term of this patent is extended or adjusted under 35 U.S.C. 154(b) by 441 days.

(21) Appl. No.: 13/271,655

(22) Filed: Oct. 12, 2011

(65) Prior Publication Data

US 2013/0097498 A1    Apr. 18, 2013

(51) Int. Cl.
*G06F 3/0481* (2013.01)
*G06F 9/44* (2006.01)
*G06F 3/0489* (2013.01)

(52) U.S. Cl.
CPC ........ *G06F 9/4443* (2013.01); *G06F 3/04892* (2013.01); *G06F 3/04895* (2013.01)

(58) Field of Classification Search
CPC ............... G06F 3/04895; G06F 9/4446; G06F 17/30893; G06F 3/048–3/04886; G06F 17/30–17/30067; G06F 17/30289–17/30737; G06F 17/30861–17/30943; G06C 30/02–30/0282
USPC ................................. 715/200–867; 463/1–69
See application file for complete search history.

(56) References Cited

U.S. PATENT DOCUMENTS

| | | | | |
|---|---|---|---|---|
| 4,964,077 A | * | 10/1990 | Eisen | G06F 9/4446 434/118 |
| 5,018,082 A | * | 5/1991 | Obata | G06F 9/4446 434/118 |
| 5,995,101 A | * | 11/1999 | Clark | G06F 3/04895 715/711 |
| 6,340,977 B1 | * | 1/2002 | Lui et al. | 715/709 |
| 9,043,699 B1 | * | 5/2015 | Shubina | G06F 17/30861 715/247 |
| 2003/0058267 A1 | * | 3/2003 | Warren | G06F 17/30716 715/705 |
| 2005/0096980 A1 | * | 5/2005 | Koningstein | G06Q 30/00 705/14.41 |

(Continued)

*Primary Examiner* — Kevin L Young
*Assistant Examiner* — Linda Huynh
(74) *Attorney, Agent, or Firm* — Mauriel Kapouytian Woods LLP; Andrew A. Noble; James Woods

(57) ABSTRACT

A method, system, and non-transitory computer readable medium to provide trigger-sensitive application help content to a user using a digital application. The method commences upon receiving an input application user interface, the input application user interface being encoded for display within a digital application context (e.g. on a computer screen or on a mobile device). Then, recoding the input application user interface to produce an output application user interface comprising one or more expandable screen devices added to the input application user interface. The user's progress (or lack thereof) is detected based on the user's interaction with the output application user interface page (e.g. on a computer screen or on a mobile device). At least one aspect of the method includes executing or otherwise interacting with a display protocol, the display protocol comprising detecting a trigger event, and revealing the expandable screen device to display an expanded screen device.

17 Claims, 11 Drawing Sheets

(56) References Cited

U.S. PATENT DOCUMENTS

| | | | |
|---|---|---|---|
| 2005/0268234 A1* | 12/2005 | Rossi et al. .................. | 715/705 |
| 2007/0255616 A1* | 11/2007 | Gjerstad ................ | G06Q 30/02 |
| | | | 705/14.47 |
| 2008/0077653 A1* | 3/2008 | Morris .............. | G06F 17/30896 |
| | | | 709/203 |
| 2009/0172537 A1* | 7/2009 | Cheng .................. | G06F 3/0481 |
| | | | 715/704 |
| 2011/0131491 A1* | 6/2011 | Lu ......................... | G06F 9/4446 |
| | | | 715/708 |
| 2011/0246880 A1* | 10/2011 | Horton ................. | G06F 9/4446 |
| | | | 715/708 |
| 2011/0320529 A1* | 12/2011 | Mentchoukov ..... | G06F 17/3089 |
| | | | 709/203 |
| 2012/0078730 A1* | 3/2012 | Ramaiyer .......... | G06Q 30/0275 |
| | | | 705/14.71 |

\* cited by examiner

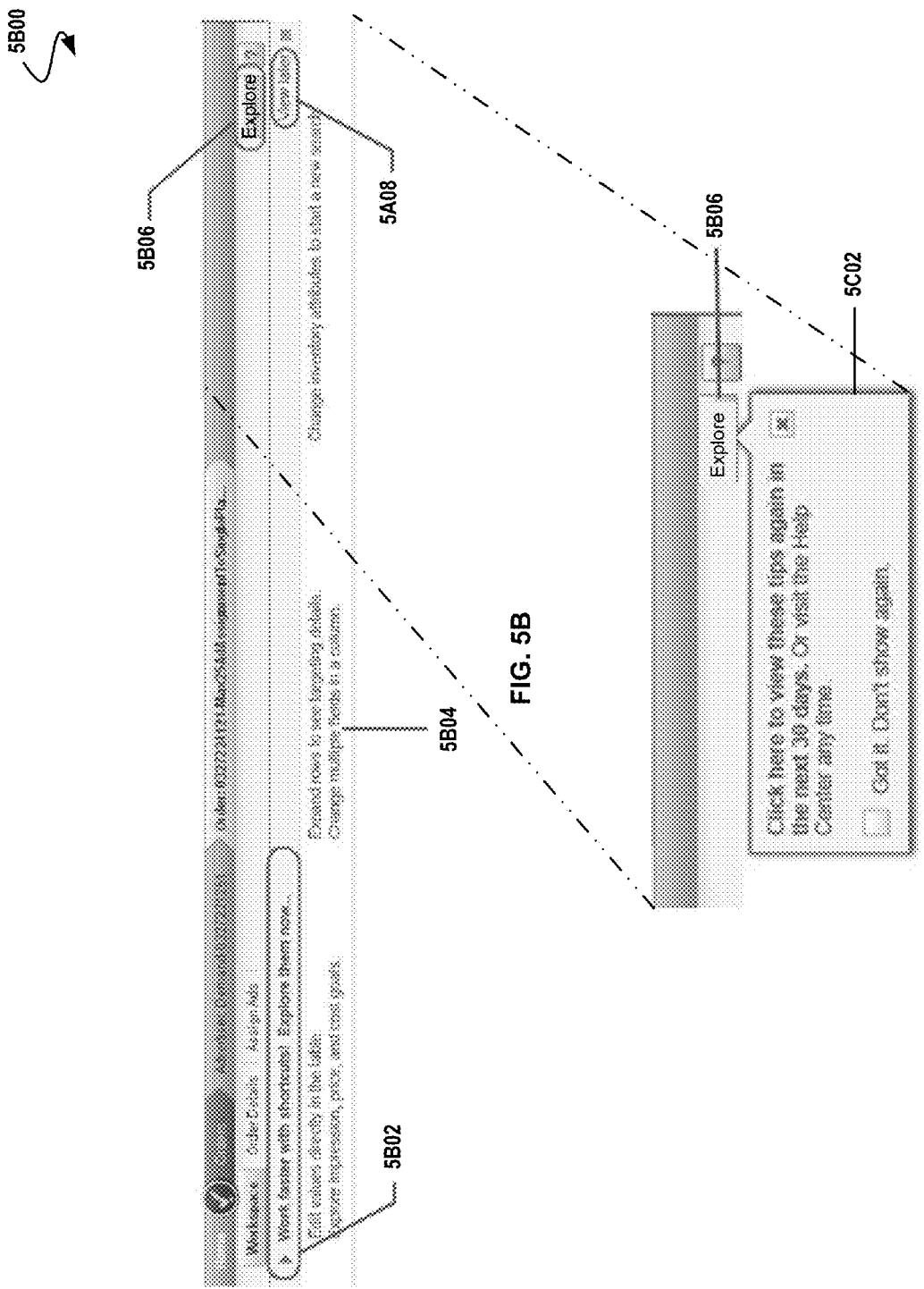

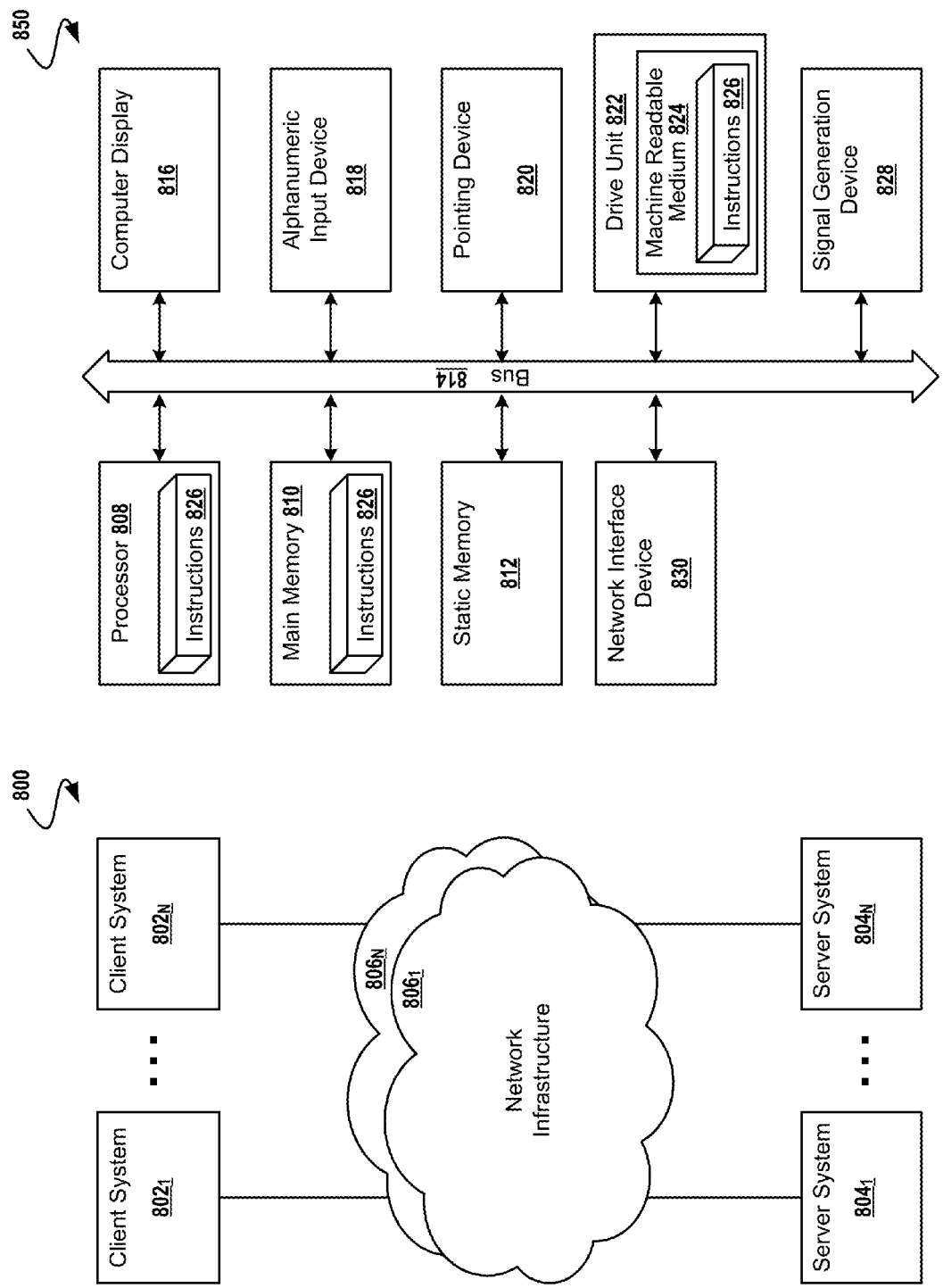

EMBEDDING NON-BLOCKING HELP COMPONENTS IN A DISPLAY PAGE USING DISCOVERY DRAWER FEATURE CUES

FIELD

The present disclosure is directed towards graphical user interfaces in digital applications, and more particularly to improving the usability of such graphical user interfaces.

BACKGROUND

With the explosion of the Internet has come a corresponding explosion of user applications. Formerly, web pages were used primarily for display of information, and user interaction was nearly limited to simple operations such as clicking a link. As the Internet has matured, so have the capabilities of web pages, and so have the techniques used by web page designers to support interaction of users with web pages. Today many web pages rely on user navigation and controls far more sophisticated than merely clicking links. In fact some web pages serve as sophisticated web applications, and in some cases, web page designers use embedded applets or other user interface techniques to support interaction of users with web pages of a web application. As the level of sophistication of web applications increases, so also do the demands on users to learn how to effectively operate new applications. Further, as the degree of mobile computing increases, legacy techniques for providing application help (e.g. a printed manual, a help manual stored in an online repository, etc) become deficient in providing the user with meaningful assistance, guidance, and knowledge as to how to operate the application.

Some deficiencies in legacy techniques are manifested when a user engages in a task using inefficient methods. This situation motivates the present disclosures, and is especially motivating when better alternatives are available, but are new, and/or unknown to the user. In some motivational cases, a user engages in a task within a digital application (e.g. an online application) without having foundational knowledge of how to achieve the best results when using the application. Further, and especially as relates to on-the-go mobile computing, legacy techniques fail when a user encounters a problem or has a question, but is unwilling to interrupt their activity long enough to go to an external help system and search for an answer. As a result, using legacy techniques, users may exert energy in a trial-and-error approach, and may lose momentum for completing the tasks at hand, and may build up frustration. Especially in the context of mobile computing, unsolicited guidance (e.g. unsolicited pop-ups) often substantially occludes the work area of the online application, and often leaves a user feeling irritated. Further, legacy techniques often interrupt the natural flow of completing a task, and in some cases actually block a user from proceeding with completion of their tasks.

Even the so-called context sensitive help components are deficient since these legacy techniques block progress or otherwise impede the flow of user's progression to complete the tasks pertinent to the application. And, legacy techniques do not account for the user's selection of a particular task completion approach, or account for the user's use (or lack of use) of particular features of the application. Thus, for these and other reasons, there exists a need for embedding non-blocking help components in a displayed page of an application.

SUMMARY

A method, system, and non-transitory computer readable medium to provide trigger-sensitive application help content to a user using a digital application in a digital application context (e.g. on a computer screen or using a mobile device). One technique as is disclosed herein implements one or more screen display devices (termed "discovery drawers") with a view to promote new features, and/or new techniques for exploiting tool efficiencies, and to promote experimentation of task processing alternatives. Further, an expanding (e.g. showable/hideable, or minimizable/maximizable) discovery drawer aids the user by highlighting various getting-started essentials. Users can avail themselves of highlighted knowledge (e.g. prerequisite knowledge) that underpins effective use of the application. Some embodiments can provide proactive resolution to predicted pain-points by answering questions at the moment in time that the user needs the answers. Moreover, a discovery drawer can do so without obscuring the application work area.

In some embodiments, a display protocol (e.g. a set of rules, possibly embedded in the application logic) can detect user readiness for receiving proactively provided information and automatically display an appropriate screen device (e.g. a widget, an expandable area, a notification, a feature cue, a hint, etc). In this manner, a discovery drawer can be displayed (e.g. by use of an expandable screen device) when trigger conditions are satisfied. The protocol supports user-directed control of the overall experience and supports user-directed queries for additional guidance.

BRIEF DESCRIPTION OF THE DRAWINGS

The novel features of the disclosures are set forth in the appended claims. However, for purpose of explanation, several embodiments of the disclosure are set forth in the following figures.

FIG. 5B depicts a populated discovery drawer in expanded form, according to one embodiment.

FIG. 5C depicts a notification in the context of a populated discovery drawer, according to one embodiment.

FIG. 8 is a diagrammatic representation of a network including nodes for client computer systems, nodes for server computer systems, and nodes for network infrastructure, according to one embodiment.

DETAILED DESCRIPTION

Figure 1A:
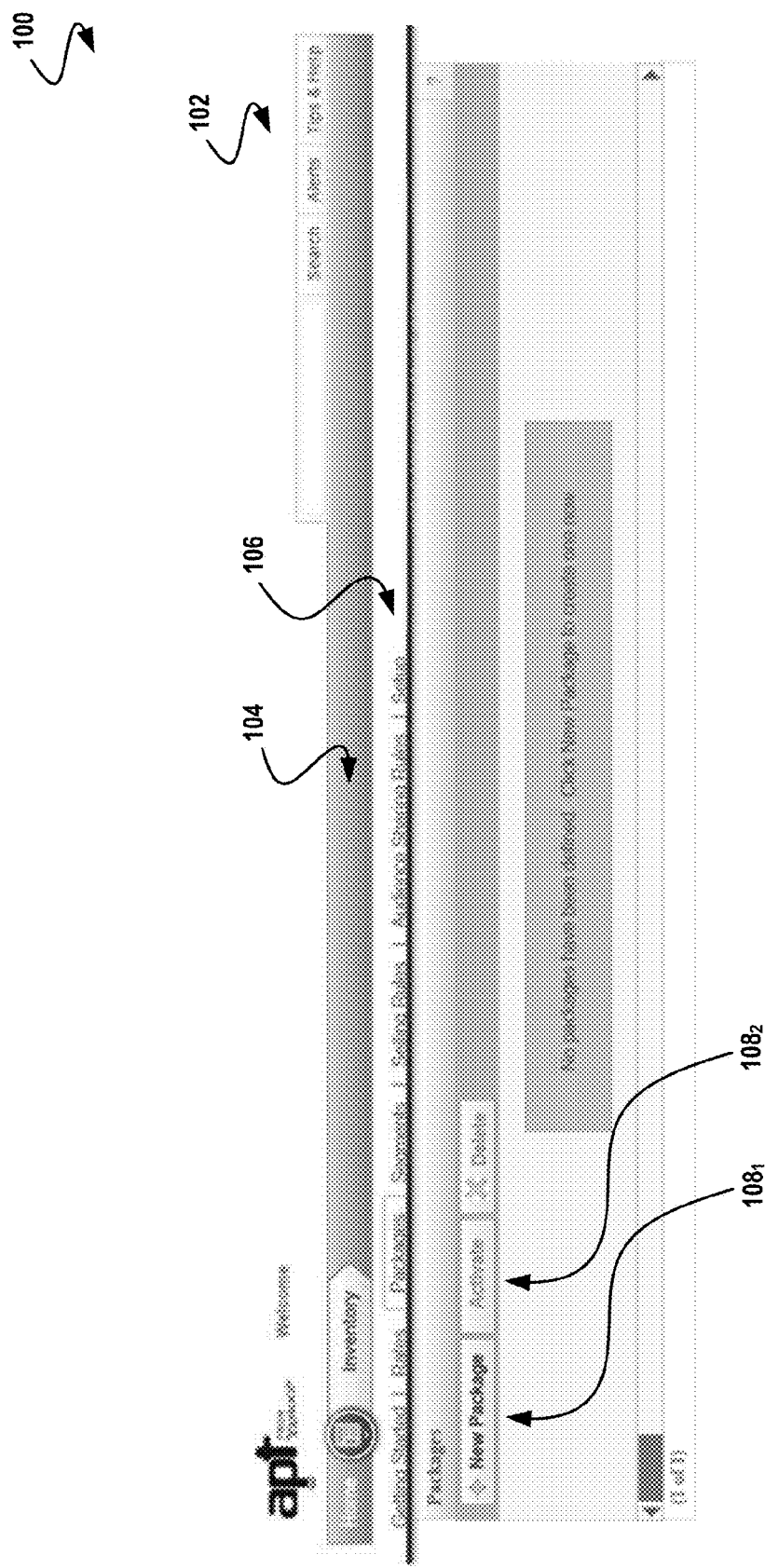
FIG. 1A depicts an application user interface comprising a single digital context, according to one embodiment.

In the following description, numerous details are set forth for purpose of explanation. However, one of ordinary skill in the art will realize that the advances may be practiced without the use of these specific details. In other instances, well-known structures and devices are shown in block diagram form in order to not obscure the description of the disclosure with unnecessary detail.

Definitions Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an item and/or a message.

"Ad call" means a message sent by a computer to an ad server for requesting a digital advertisement to be displayed.

"Ad click-through rate" (e.g. click-through rate) means a measurement of ad clicks per a period of time.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may include one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Digital Context" means a web page or a display of digital content using a downloadable application.

"Impression" (e.g. ad impression) means a delivery of an ad to a user device for viewing by a user.

"Item" means an ad, which is defined above.

"Message" means an ad, which is defined above.

"Messaging" means advertising, which is defined above.

"Network" means a connection, between any two or more computers, that permits the transmission of data. A network may be any combination of networks including, without limitation, the internet, a local area network, a wide area network, a wireless network, and/or a cellular network.

"Publisher" means an entity that publishes, on a network, a web page, a downloadable application and/or other digital context having digital content and/or digital ads, etc.

"Server" means a software application that provides services to other computer programs (and their users) on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social graph" means the relationships between individuals communicating in an online environment and relative to all connections involved.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from digital contexts. Examples of a web browser include, without limitation, Mozilla Firefox™ and Microsoft Internet Explorer™.

"Web page" means documents written in a mark-up language including, without limitation, HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator). "Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one digital context to a display device. An example of a web server is a Yahoo!™ web server. A server is defined above.

"Website" means one or more digital contexts. A website preferably includes a plurality of digital contexts virtually connected by links or URL addresses to form a coherent group.

Motivation for Embedding Non-Blocking Help Components in a Display Page Using Discovery Drawer Feature Cues As earlier indicated, as the level of sophistication of web applications increases, so also do the demands on users to learn how to effectively operate these new applications. Scores or hundreds or more new applications are deployed daily. Some applications use legacy techniques for user interaction, however as innovations are brought to bear in computing (e.g. in the context of the mobile computing explosion), a user who is operating the new application for the first time is likely unaware of new features or capabilities. For supporting new features or capabilities, designers are often motivated to change the user interface in order to add new capabilities. Yet, in some cases the changed user interface can be disorienting to a user. In fact, numerous usability tests suggest that users resist navigating out of the application in order to access an external help system. The disclosure herein addresses such usability by delivering contextually-relevant teaching points for the page at hand. Thus, users can move freely between teaching points in the drawer and between the fully-functional work area of the application.

One technique as is disclosed herein dedicates one or more areas (heretofore termed "discovery drawers" or a "drawer" or "drawers") with a view to promote new features, new techniques for exploiting tool efficiencies, and to promote experimentation of task processing alternatives. Further, an expandable (e.g. showable/hideable, or minimizable/maximizable) discovery drawer can aid the user by highlighting various getting-started essentials, can aid the user by highlighting prerequisite knowledge underpinning effective use of the application, and can proactively provide resolution to predicted pain-points by answering questions at the time that the user needs the answers. Moreover, a discovery drawer can do so without suffering the deficiencies of legacy solutions and, more particularly, without obscuring the application work area.

Following some embodiments (further described below), a display protocol (e.g. a set of rules, possibly embedded in the application logic) can detect user readiness for receiving proactively provided information and automatically display an appropriate screen device (e.g. a widget, an expandable area, a notification, a feature cue, a hint, etc). In this manner, a discovery drawer can be displayed (e.g. by use of an expandable screen device) when trigger conditions are satisfied. The display protocol supports user-directed control of the overall experience and supports user-directed queries for additional guidance. In some embodiments, a user can direct such requests on demand by clicking links in or near a discovery drawer that reveals feature cues or other educational support. This way, the user can immediately apply the learning without leaving the application page. The user can explicitly control the reveal and minimize actions of a discovery drawer. Or the application can automatically operate on a drawer (e.g. minimize or maximize a drawer) based on certain types of trigger events such as a timeout of a certain period of time.

Thus, by addressing questions, problems, and knowledge gaps at the point of need, users can stay on task and minimize loss of momentum by avoiding undue interruption and time spent searching for answers. And, using a discovery drawer, users can try out features and techniques as they are learned. As is now understood, using a discovery drawer in an application makes learning about the application seamless with the actual use of the application. And, access to teaching points is not interrupted by passing the user off to information or options contained in external databases, new pages, new overlays, new browser tabs, or new browser windows. This eliminates unnecessary cognitive load cross-correlating between the application page and content or options delivered out-of-page. Users are more likely to enjoy and have a successful application usage experience when the application is attuned to user readiness for the information (e.g. attuned to when the user has met appropriate conditions for operating the drawer).

In addition to the above capabilities, including elimination of hindrances for correlating assistance with specific page functionality, a discovery drawer serves as a repository for high-density content.

FIG. 1A depicts an application user interface 100. As shown the application user interface 100 comprises a single digital context (e.g. a digital application page 102), which context has a title bar 104, a feature bar 106, and user interface screen devices (e.g. button $108_1$, and button $108_2$), and other areas. The context shown can be displayed as a web page on a desktop computer screen, or a laptop computer screen, or a tablet computer screen, or a mobile device screen. The digital context is encoded for display on such as the aforementioned devices. For example, the page can be encoded as an HTML page, or an HTML page with an applet, or even encoded in a non-HTML native format such as Javascript, or Adobe™ Flash™ or Silverlight™.

As earlier indicated, as new capabilities are brought to bear in computing, a user who is operating the new application for the first time is likely to be initially unaware of new features or capabilities. Strictly as an example, if the user were seeing for the first time the application user interface 100, and specifically the interface screen device for "New Package" (e.g. button 1080), then the user might not know precisely what to do, or how to use the "New Package" features. Designers often have no choice but to add features to an application, and often elect to change the user interface in order to add the new features. Yet, in some cases the changed user interface can be disorienting to a user. Such a situation can be addressed through use of one or more discovery drawers as is depicted in the following figures.

Figure 1B:
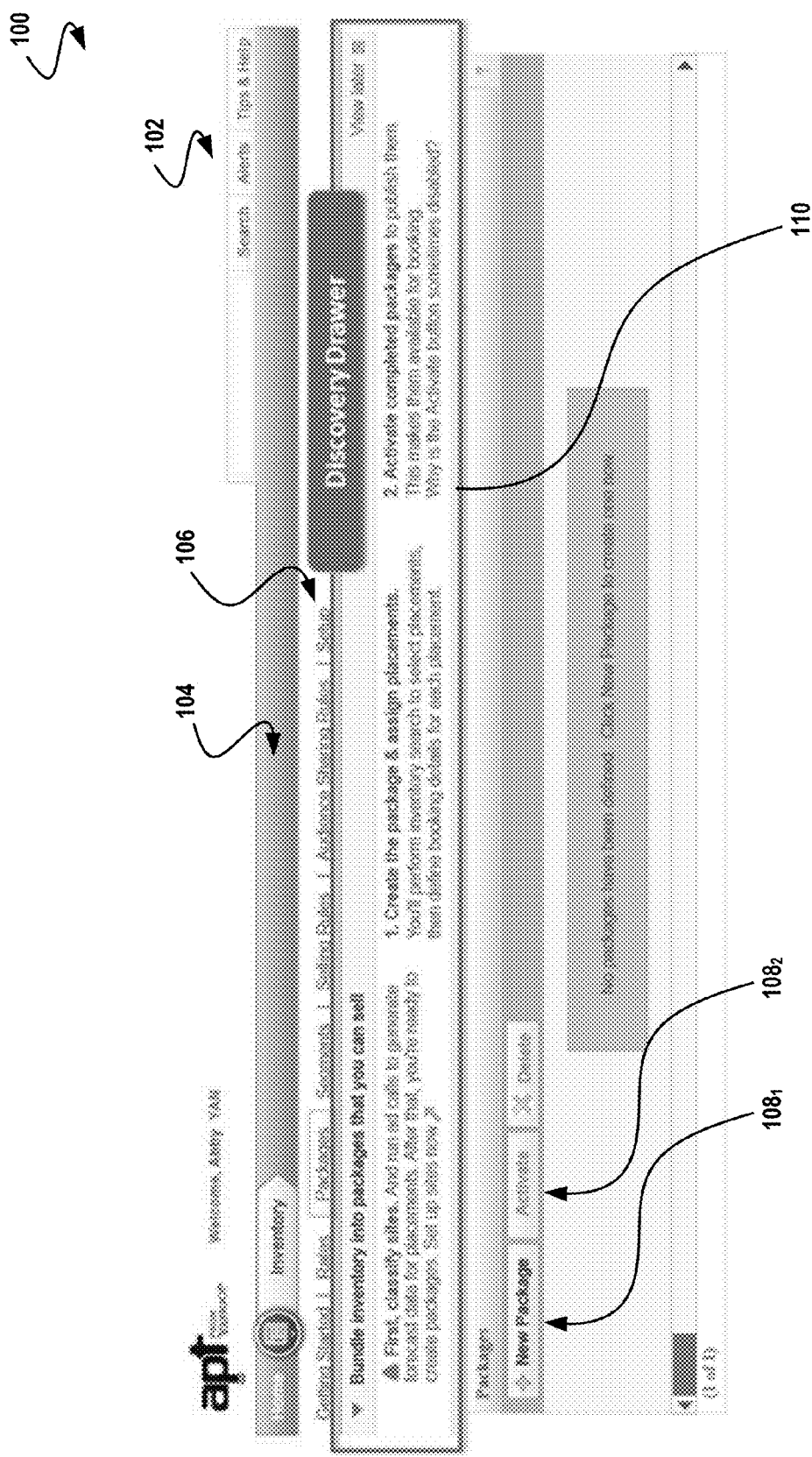
FIG. 1B depicts another application user interface comprising a single digital context, according to one embodiment.

FIG. 1B depicts another application user interface 100. As shown the application user interface 100 comprises a single digital context. A single digital context comprises images and text displayed on a single display screen, such as is composited for rendering into a digital application page 102. A digital application page 102 can include user controls (e.g. scroll bars, hovering, user control screen devices, etc) that may be operated at will by a user. The embodiment of FIG. 1B also depicts one instance of a discovery drawer screen device 110. Following the characteristics of this exemplary embodiment, the discovery drawer screen device 110 comprises an area within application user interface 100 for aiding the user to learn about the new feature, in this case the "New Package" feature. The appearance of a discovery drawer area within application user interface 100 does not occlude the underlying page; rather, the appearance of an exemplary discovery drawer area within application user interface 100 operates by revealing itself without occluding the user work spaces of the page.

Following the embodiment of FIG. 1B, the application user interface 100 has a title bar 104, a feature bar 106, and user interface screen devices (e.g. button 108₁, and button 108₂). In the context shown, the discovery drawer screen device 110 can be displayed as a web page on a desktop computer screen, or a laptop computer screen, or a tablet computer screen, or a mobile device screen. In such an environment, the digital context is encoded for display on the aforementioned devices. For example, the page can be encoded as an HTML page, or an HTML page with an applet, or even encoded in a non-HTML native format such as Adobe™ Flash™ or Silverlight™.

The discovery drawer screen device 110 can be displayed explicitly by user election, or it can be displayed on the basis of one or more triggers. For example, if the user had hovered a mouse over the "New Package" screen device for some few seconds, yet without clicking the button, that sequence of events could be interpreted by a display protocol processor as an indication that the user was tentative about proceeding, and an application processor might reveal the discovery drawer screen device 110. As another example, if the user had aborted a multi-touch gesture over the "New Package" screen device after some few seconds, yet without touching the button, that sequence of events could be interpreted by a display protocol processor as an indication that the user was tentative about proceeding, and an application processor might reveal the discovery drawer screen device 110.

In such a fashion the application user interface 100 with a discovery drawer screen device 110, and in combination with a display protocol processor, serves to aid the user to discover information about application features.

Figure 2:
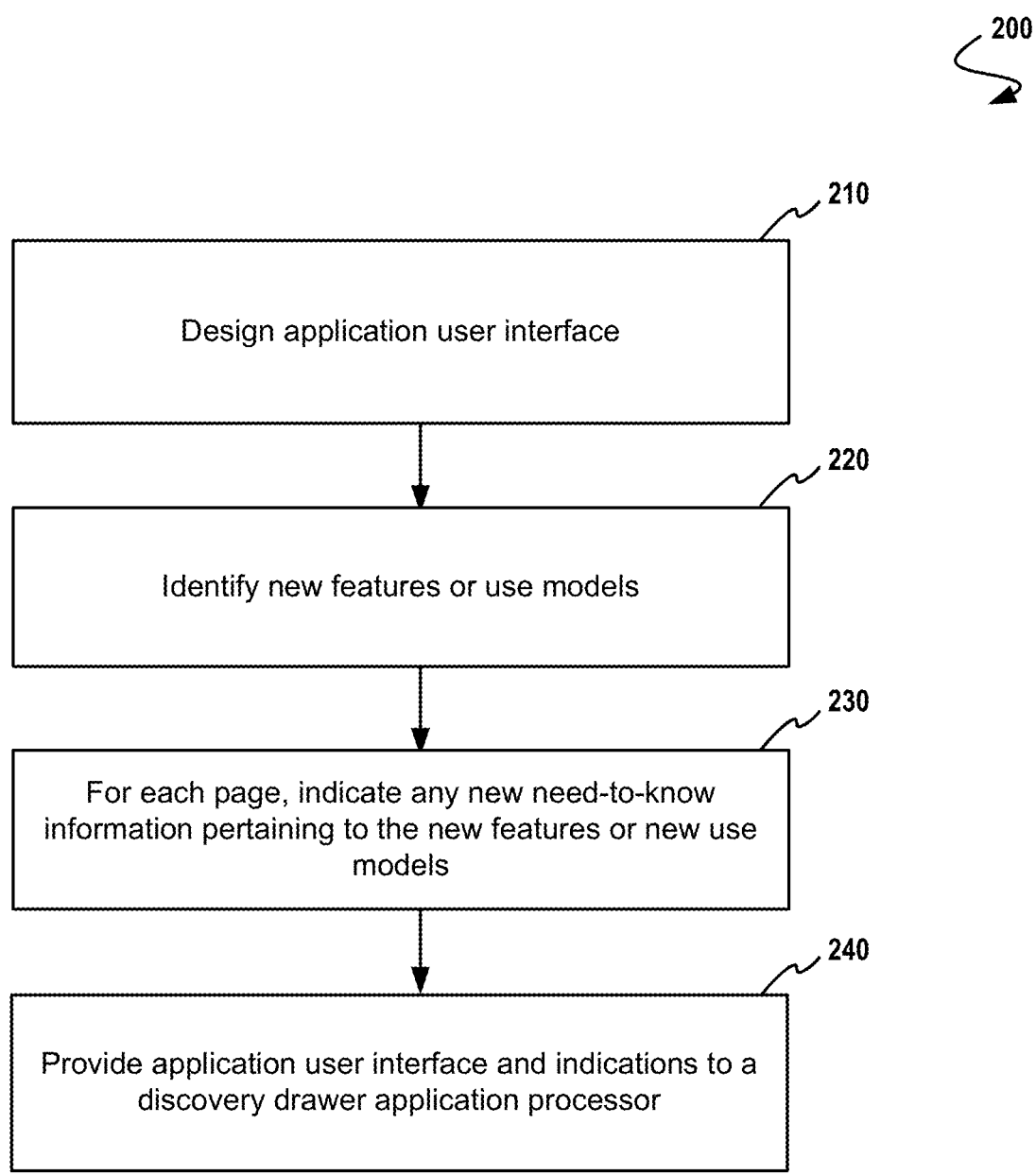
FIG. 2 is a flowchart of a method for developing an application user interface having new features, according to one embodiment.

FIG. 2 depicts a method 200 for developing an application user interface having new features. As shown, the designer commences to design a user interface using any available techniques (see operation 210). The designer proceeds to identify new features and/or use models (see operation 220), which new features and/or use models might be explained using a discovery drawer (e.g. a discovery drawer screen device in combination with a display protocol processor to identify triggers).

Then, the designer might indicate any need-to-know information pertaining to the new features and/or use models (see operation 230). Given an application user interface design (e.g. in the form of HTML or XHTML, or other digital code), and an indication (e.g. a tag in HTML, or a tag in XHTML, etc) of any need-to-know information pertaining to the new features and/or use models, the application user interface design is then provided as input to a processor (see operation 240), which processor (e.g. a discovery drawer application processing module) for processing to include discovery drawer components (e.g. any instances of the aforementioned expandable screen devices). A network for implementing a digital application delivery system, including a discovery drawer application processing module, is described below.

Networked Systems for Hosting a Discovery Drawer Application Processing Module

Figure 3:
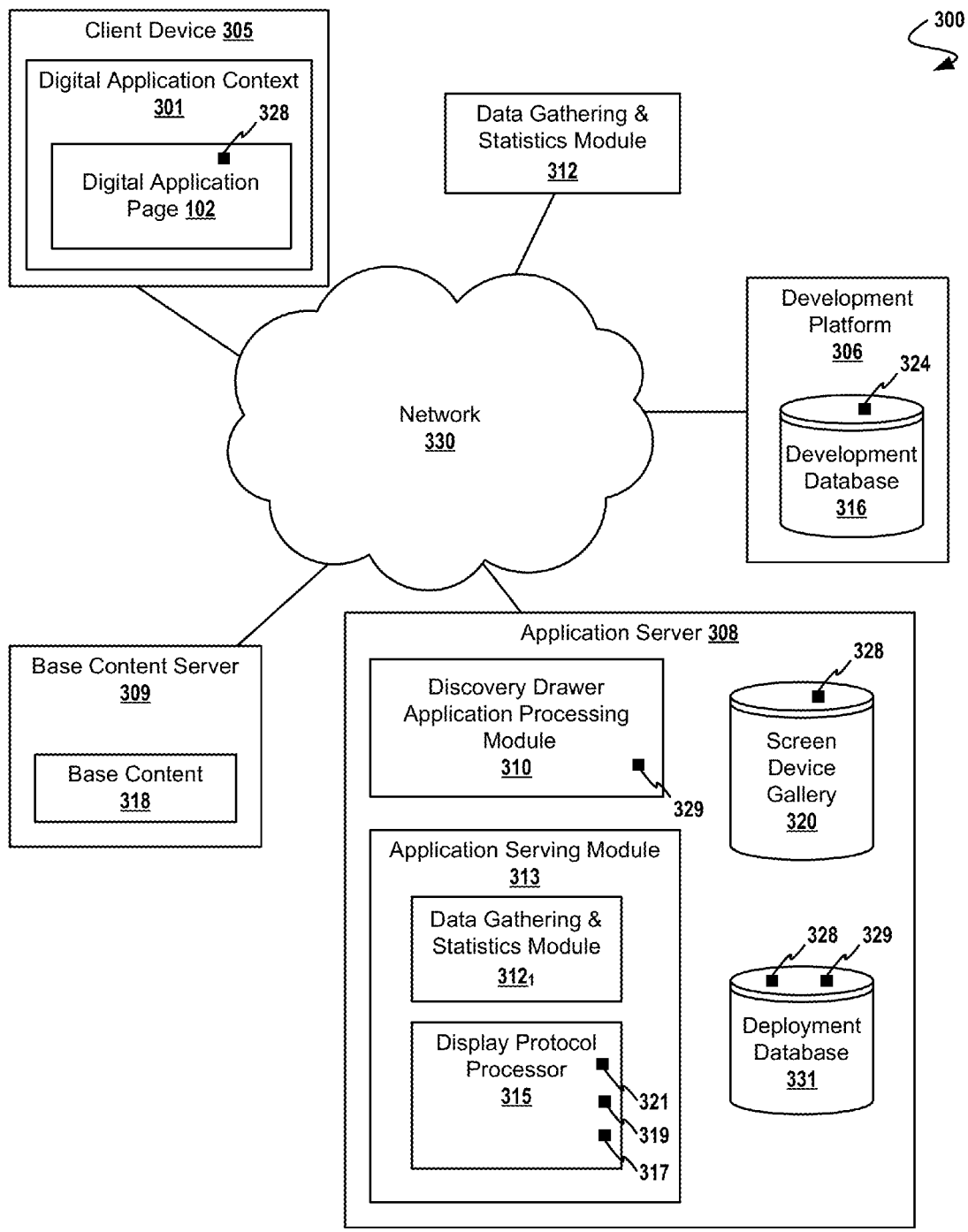
FIG. 3 depicts a digital application delivery network environment including a discovery drawer application processing module, according to one embodiment.

FIG. 3 depicts a digital application delivery network environment 300 including a discovery drawer application processing module 310. Such a digital application delivery network environment implements a system whereby when an internet user, via a client device 305, renders a digital application page 102 (e.g. a web page) within a digital application context 301, which digital application page is composited in part by an application server 308. In some cases a base content server 309 serves as a repository for base content 318. Strictly as an example, a digital application page might be composited using some portion of base content (e.g. a logo, a banner, a look-and-feel specification, etc), to which can be added additional content (e.g. news, tweets, discovery drawer screen devices, etc), and such composition can be performed in an application serving module 313 and/or in a discovery drawer application processing module 310. As for compositing a digital application page using discovery drawer screen devices, such composition can be performed using a screen device gallery 320, which screen device gallery can comprise any number of discovery drawer screen devices (see FIG. 4A and infra).

Returning momentarily to the discussion of FIG. 2, an application user interface design is provided as input to a processor, which processor (e.g. a discovery drawer application processing module 310) for processing to include discovery drawer components (e.g. any instances of the aforementioned expandable screen devices). In the embodiment of a digital application delivery network environment 300, the discovery drawer application processing module 310 serves to process an application user interface design, and uses the screen device gallery 320 from which it obtains discovery drawer components including any number of instances of an expandable screen device 328, as shown.

The application server 308 further operates to serve digital application pages over a network 330 to a user operating a client device 305. Exemplary embodiments of the client device 305 comprises devices with a screen for display, and such a screen can be used to display digital application pages 102, possibly including any number of instances of an expandable screen device 328. In some cases a client device (e.g. a desk-side computer or workstation) can be used as a development station. In such a use, the development station can be substantially self-contained within a development platform 306, or the development station can use facilities provided by a development platform 306. Such a development platform 306 manages a development database 316, and the development database 316 contains a digital application under development including the aforementioned application user interface 100 including under-development code (e.g. in the form of an input application user interface 324). In an exemplary flow the under-development code including an input application user interface 324 is provided to the discovery drawer application processing module 310 for compiling, recoding, or other processing (see operation 240 of FIG. 2) in order to produce an output application user interface 329 where the output application user interface 329 includes an expandable screen device added to the input application user interface 324. A copy of the output application user interface 329 can be stored in a deployment database 331, which copy is served to a client device 305 on demand.

As mentioned in the discussion of FIG. 1B, a discovery drawer screen device 110 (e.g. a discovery drawer screen device added into output application user interface 329) can include an expandable screen device which can be displayed explicitly by user election, or it can be displayed on the basis of a sequence of events interpreted by a display protocol processor 315. The display protocol processor 315 shown within application serving module 313 is such a display protocol processor that serves to capture user states, and transitions, and that serves to process (e.g. detect, raise, store, etc.) one or more instances of a trigger event 317 (see operation 417) based on previous states and current events. In other embodiments a display protocol processor can comprise instructions for protocol processing, and can reside in modules other than the application serving module 313. For example, instructions for display protocol processing can reside and be executed within or on client device 305, or can reside within the code of the application user interface design (e.g. in Javascript or other interpreted or executable code). Furthermore, various state conditions, including the occurrence of one or more trigger events can raise a user readiness indication 319, and such a user readiness indication can be declared by a display protocol processor 315 (or other module), and the user readiness indication 319 can be used in rendering the output application user interface, and/or can be used as a state or timer event or other event, which states or events are used in subsequent operations. In some cases a user readiness indication is calculated periodically, based on a state progression (e.g. progression through a plurality of states and/or events). In particular, a timer event can be raised by a display protocol processor 315, and the status of the timer event can be saved. Strictly as an example, a timeout period can be managed for an expandable screen device in the form of an expandable screen device timer 321, and the expiration of such a timer can raise an event.

In some embodiments, the digital application delivery network environment 300 might host a variety of modules to provide digital application delivery network management and control operations (e.g. a data gathering and statistics module 312) pertinent to serving digital applications to users. In particular, the modules, network links, algorithms, protocols, serving policies, and data structures embodied within the digital application delivery network environment 300 might be specialized so as to perform a particular function or group of functions reliably while observing latency, capacity and performance requirements.

Trigger Processing in a Discovery Drawer Application

Figure 4:
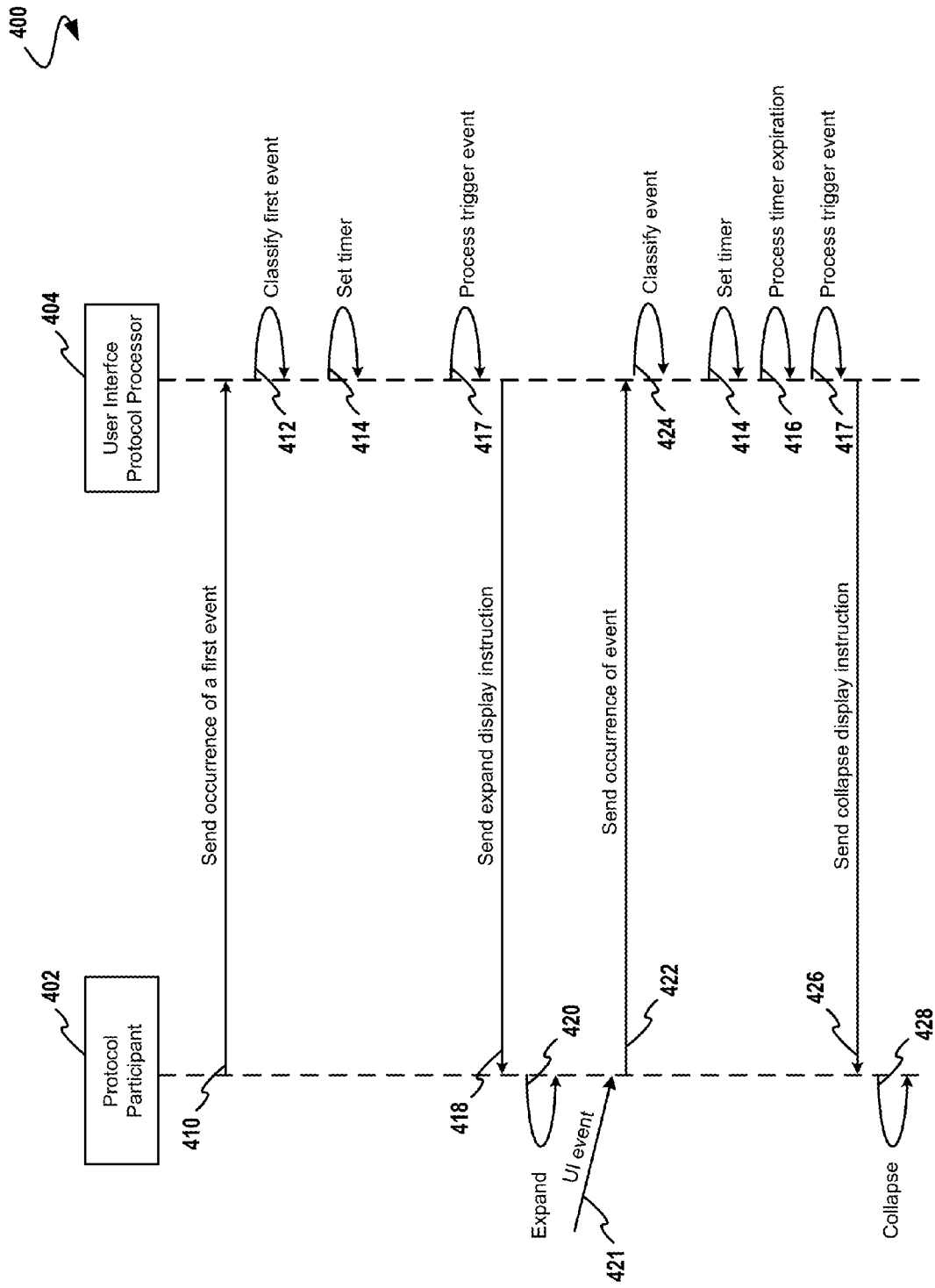
FIG. 4 is a diagram of a use model for processing a display protocol, according to one embodiment.

FIG. 4 is a protocol diagram for a display protocol 400. As earlier indicated, instructions for a display protocol 400 can reside and be executed within or on client device 305 (see protocol participant 402). Instructions for display protocol processing can reside within the code of the application user interface design, or instructions for display protocol processing can reside within an application server 308 (see protocol participant 402). Regardless of the specific location of the instructions for display protocol processing, a protocol can be observed. As shown, a protocol commences when a client device sends an occurrence of an event (see event 410) to the user interface protocol processor 404. Upon receipt of the contents of a message or call corresponding to event 410, the user interface protocol processor classifies the event (see operation 412) and sets a timer (see operation 414), for example an expandable screen device timer 321. In this scenario, the user interface protocol processor 404 processes the trigger event (see operation 417), based on the results of operation 412, and sends an instruction to expand (e.g. maximize) an expandable screen device. In other scenarios the user interface protocol processor 404 can send an instruction to collapse (e.g. minimize) an expandable screen device.

The client device, upon receipt of the contents of a message or call corresponding to event 418, expands (e.g. reveals) one or more expandable screen devices to reveal the applicable need-to-know information (see operation 420). Continuing the protocol example, the display continues when a user creates a UI event (see UI event 421), which in turn causes the client device to send the occurrence of the event (see message 422) to the user interface protocol processor 404. Upon receipt of the contents of, or upon execution of a call corresponding to message 422, the user interface protocol processor classifies the event (see operation 424) and sets a timer (see operation 414). The timer might expire, and if so (as shown) the user interface protocol processor 404 processes the timer expiration (see operation 416) and process one or more trigger events 317, which in turn might cause the user interface protocol processor 404 (e.g. display protocol processor 315) to send a collapse display instruction (see event 426). The client device, upon receipt of the contents of a message or call corresponding to event 426 collapses one or more expandable screen devices (see operation 428).

A trigger event 317 can result from a multitude of states, changes to states, timeout events, user events, UI events, asynchronous events, or other events. In some embodiments, states and associated state information is managed per page (e.g. per each digital application page) and per user by means of a state manager (e.g. a user interface protocol processor 404 or other protocol processor). A given instance of a state manager serves to manage events for a particular user, and for a particular page. For example, if a particular user (e.g. "User A") is interacting with a particular digital application page (e.g. "Page X"), then the state manager can record (e.g. in some temporary and/or persistent storage location) the drawer's initial state or states (e.g. the drawer's initial expand/collapse/minimize/maximize states). Upon any rendering of the Page X, the specific states of the drawer's states can be used to render the drawer screen devices based on the User A's last interaction with Page X. Additionally, any last actions (whether or not the last actions caused a trigger event) can be saved. Furthermore, any last actions can be stored in a preferences area (e.g. in a cookie or other persistent storage location) and can be restored (e.g. from the cookie or other persistent storage location) in order to implement the user's preferences for that particular digital application page, including the states of the drawer and/or its constituent screen devices. In some cases the preferences are automatically restored (e.g. to implement sticky user preferences). Initially (e.g. before any user display of a particular digital application page), a set of defaults can be implemented. For example, a default setting might prescribe that a drawer is expanded upon first rendering. Alternatively, a default setting might prescribe that a drawer is collapsed upon first rendering. In still another embodiment, a default setting might prescribe that a drawer is expanded or collapsed based upon aspects of the user's client device environment or previous states (e.g. the explore button's enable-disable state). In these and other embodiments, the re-rendering of a particular digital application page can be tuned to provide a comfortable interaction experience.

User Interface Screen Devices in a Discovery Drawer Application

Figure 5A:
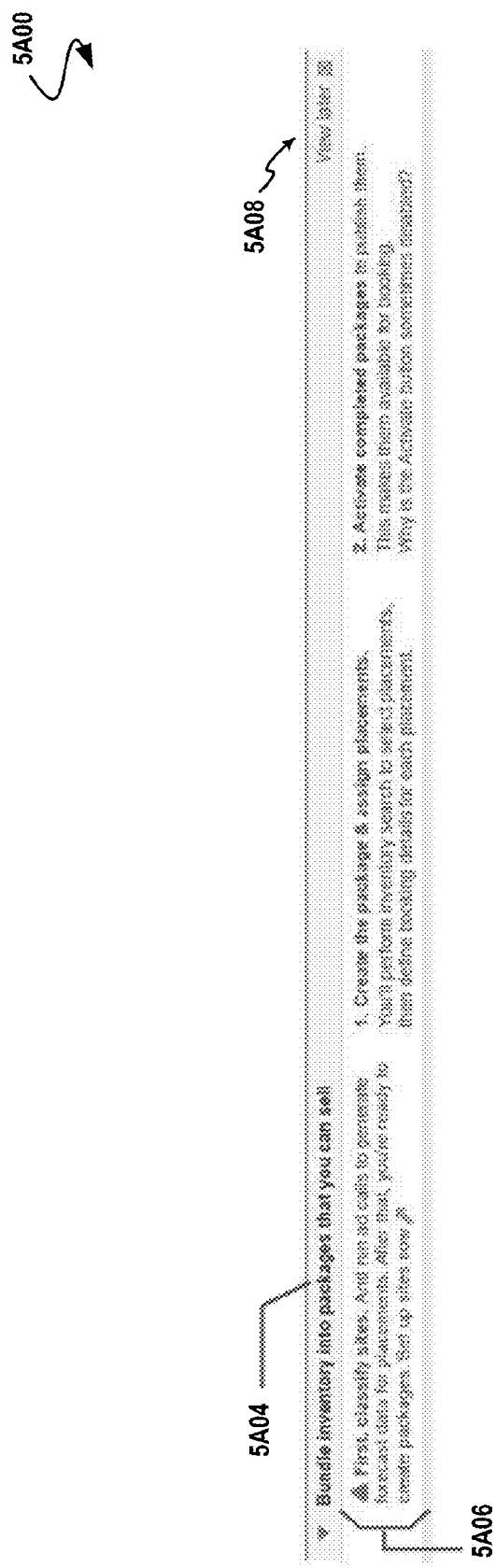
FIG. 5A depicts a discovery drawer in expanded form, according to one embodiment.

FIG. 5A depicts a discovery drawer 5A00 in expanded form, and shows callouts for selected anatomical parts visible in the expanded form. As shown, the discovery drawer comprises a drawer title bar 5A04, a drawer body 5A06, and view later user control 5A08. Any of the aforementioned anatomical parts are customizable by the designer. For example, a designer may make the text of the drawer title bar be any string of characters, or even an appropriately sized image. Similarly, a designer may make the text of the drawer body contain any sort of arrangement of characters, words, paragraphs, or even an array of appropriately sized images. Embodiments of a discovery drawer comprise user controls (further discussed below). In this example of FIG. 5A, a "view later" user control 5A08 suggests to the user that the user control (e.g. the "x" screen device) can be selected to hide the discovery drawer to possibly reveal at a later time.

FIG. 5B depicts a populated discovery drawer 5B00 in expanded form, and shows callouts for the selected anatomical parts visible in the expanded form. As shown, the populated discovery drawer comprises a drawer title bar, a drawer body, and view later user control 5A08. Also shown is an explore user control 5B06, a collapse-expand user control 5B02, and a feature cue 5B04. The collapse-expand user control 5B02 serves to allow a user to explicitly control the minimizing or maximizing of the discovery drawer. In some cases the explicit user control is processed as an asynchronous event, and the user interface protocol processor 404 might receive the asynchronous event and (for example) cancel a timer.

In exemplary embodiments, collapse-expand user control 5B02 serves to allow the user to explicitly expand-collapse the discovery drawer by clicking or touching the drawer title bar. Alternatively, the "view later" user control 5A08 serves to allow the user to explicitly hide the discovery drawer by clicking or touching the "view later" user control 5A08. Doing so, such that the discovery drawer is hidden, also serves to enable the "explore" user control 5B06. Various embodiments observe user interface closure policies such that disabled user controls are hidden or grayed out or dimmed and, as an exemplary embodiment, offer further aid the user by offering hints or instructions to the new user. For example, on the first explicit use of the "view later" user control 5A08 to hide the discovery drawer, a hint is provided to the user that explains how to use the "explore" user control 5B06 for later uses of the drawer. The determination of a "new" user can be coded into the behavior of the user interface protocol processor 404. And, in some cases, the display protocol 400 sets timers to keep track of the newness of the user, which timers can be used to assess user learning progress and provide additional hints. The state or states of a particular user is captured by a user interface protocol processor 404 and the state or states persist across uses of the application.

Still other embodiments of populated discovery drawer 5B00 comprise a scroll bar for controlling the view port of a scrollable region.

FIG. 5C depicts a notification 5C02 in the context of a populated discovery drawer 5B00. As shown, the notification offers the user a suggestion to schedule a revisitation (e.g. in 30 days), and an offers the user a suggestion to avoid a re-display of the notification in the future (e.g. using the check box next to "Got it. Don't show again.").

The example of FIG. 5C is merely one embodiment, and many other application customizations are possible, following the embodiments disclosed herein. For example, an application designer can establish a particular expiration period to define the elapsed time the drawer is available in the application. And a display protocol 400 can be implemented such that any of the aforementioned timers and expiration periods apply uniquely to each unique user. Moreover, the explore user control 5B06 can include a tooltip having text that explains what the user will learn when they open the drawer. The tooltip display characteristics can be coded into the instructions for the display protocol processor.

Figure 5D:
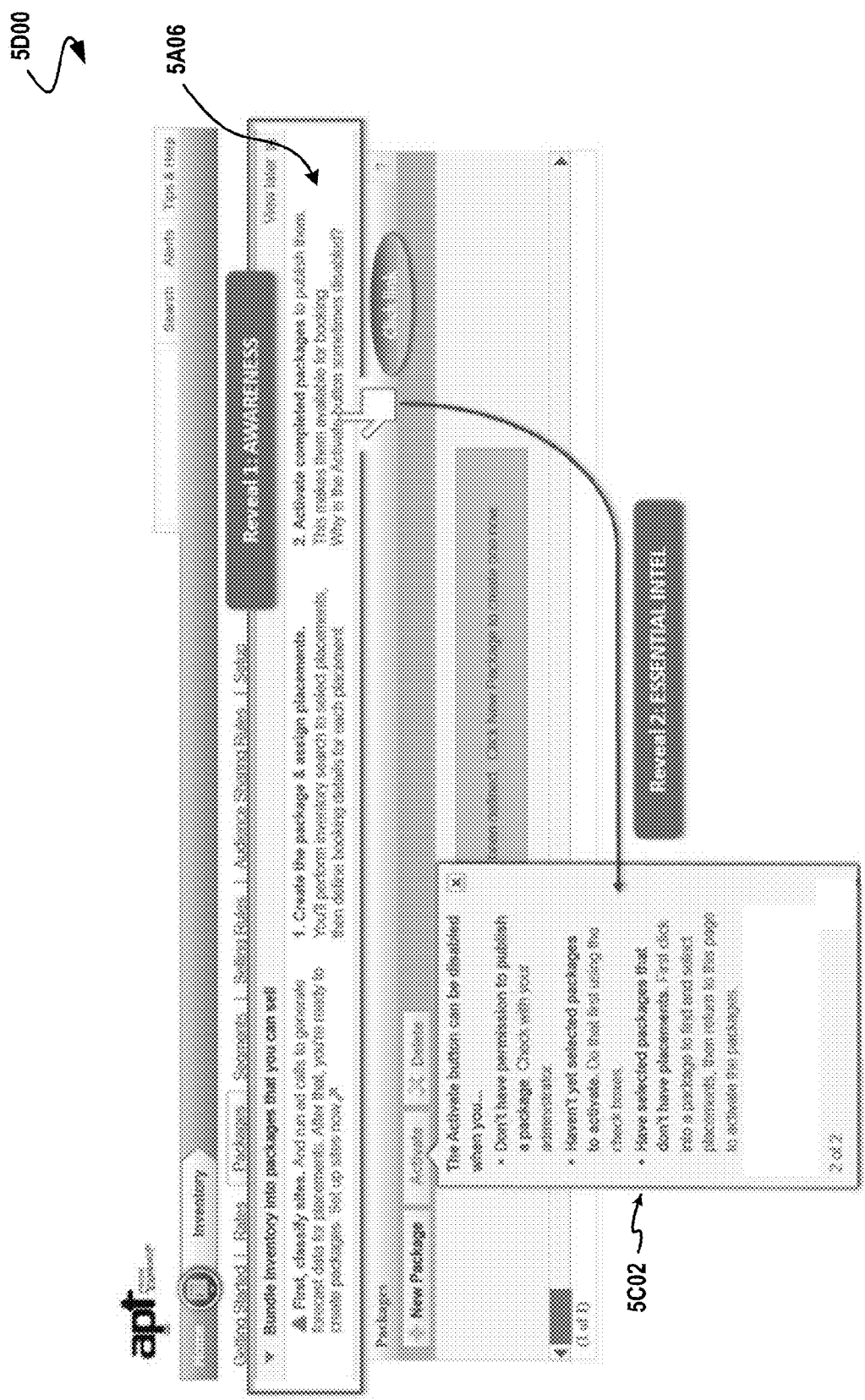
FIG. 5D depicts an expanded discovery drawer and showing levels of callouts for the selected anatomical parts visible in expanded form, according to one embodiment.

FIG. 5D depicts an expanded discovery drawer 5D00, and shows two levels of callouts for the selected anatomical parts visible in expanded form. As shown, the discovery drawer 5D00 includes two levels of need-to-know information for the user, namely "Reveal 1: Awareness", "Reveal 2: Essential Intel". A third level of need-to-know information can be retrieved using third-level techniques.

TABLE 1

| Progressive revelation techniques | |
|---|---|
| Technique Description | Example |
| Grab the user's attention and direct focus to need-to-know-now information for the page and task at hand. | Discovery drawer title and text within the drawer body. |
| Deliver topical information given intelligence about user activity. Deliver the right information at the right time based on trigger conditions for the current user. | Discovery drawer title and text within the drawer body. Display drawer when user interaction (e.g. clicks, multi-touch gestures) with the application suggests lack of confidence (e.g. timer timeouts). |
| Address predicted questions and pain points a user might encounter on a page. | Provide concise hints and instructions in the discovery drawer. |
| Convey multiple key messages about the page. | Provide concise hints and instructions about nearby user controls and application features in the discovery drawer. |
| Define trigger conditions that reflect user readiness (or lack or readiness) for the information. | Detect when user interacts with a feature in an unexpected or inefficient manner and predict the user's readiness. |
| Set an expiration period for the drawer. | For example, 30 days: Knowing that the information won't be readily available forever might motivate a user to develop an application interaction skill sooner rather than later. |

Any one or more of the progressive revelation techniques of Table 1 can be used during the course of development of an application. Moreover, a designer, during the course of an application user interface design, can encode an indication (e.g. a tag in HTML, or a tag in XHTML, etc) or instructions (e.g. instructions in the form of a tag, or in the form of a scripting language) to direct an application processing module to include the hints and/or need-to-know information pertaining to the new features. In turn, the application processing module adds discovery drawer components (e.g. any instances of the aforementioned expandable screen devices) to the input application user interface, and outputs the result for an application serving module to deliver (e.g. on demand) to a user.

Figure 6:
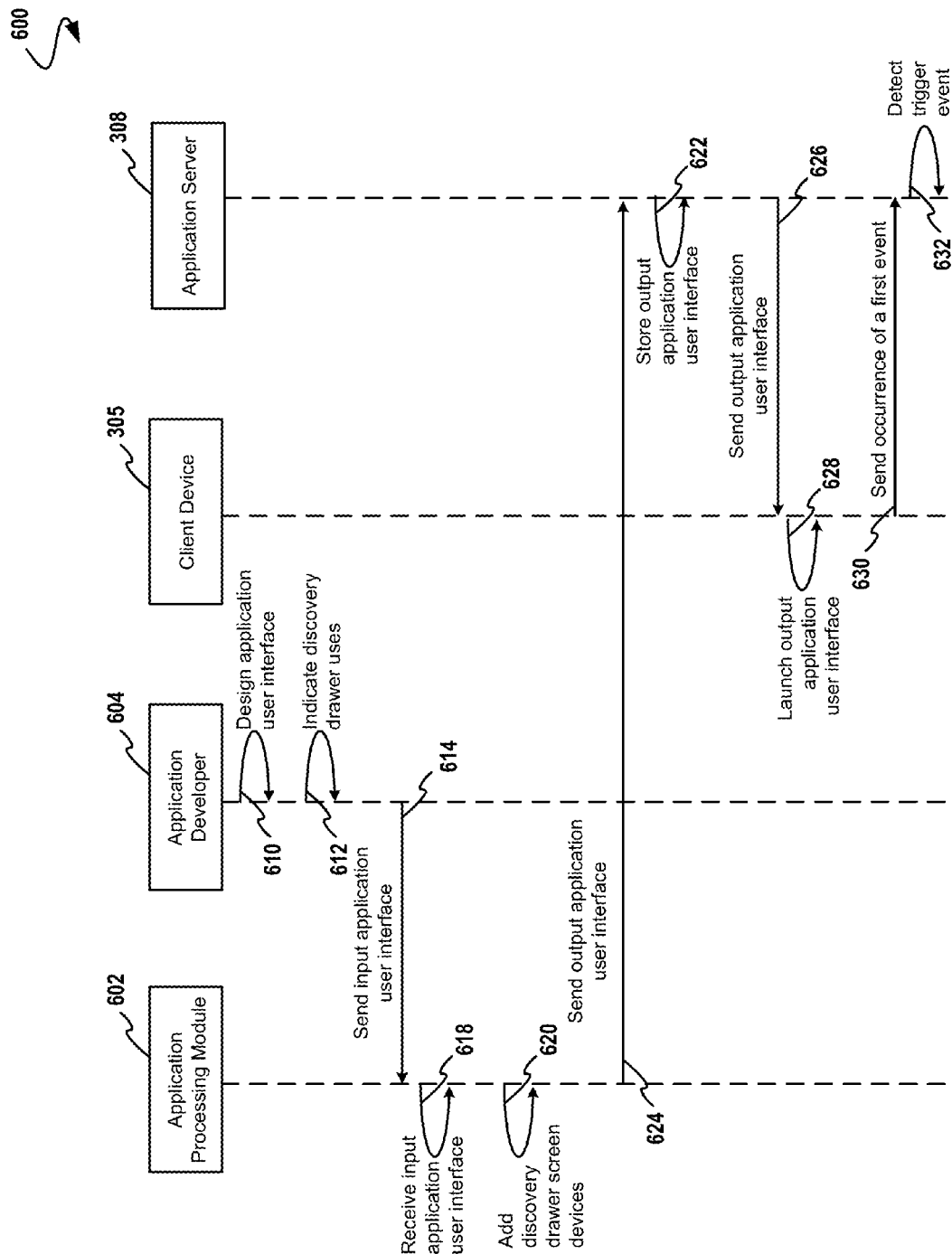
FIG. 6 is a diagram of a use model of a system for embedding discovery drawer help components in a display page of a digital application, according to one embodiment.

FIG. 6 is a diagram of a use model 600 of a system for embedding discovery drawer help components in a display page of a digital application using a display protocol. As shown, the use model shows the interaction between various actors in the system for embedding discovery drawer help components, namely an application processing module 602, an application developer 604, a client device 305, and an application server 308. Any of the aforementioned actors can be implemented in any one or more of the systems described in the figures discussed supra. Or, any of the application processing module, the client device, and/or the application server can be implemented using one or more processors and memory. The use model 600 commences when a designer designs a digital application and its application user interface (see operation 610), and proceeds to encode an indication (e.g. a tag in HTML, or a tag in XHTML, etc) or instructions (e.g. instructions in the form of a tag, or in the form of a scripting language) to direct the application processing module 602 to include the hints and/or the need-to-know information pertaining to the new features. Having encoded such an indication (see operation 612), the application is sent to the application processing module (see event 614), which is received as an input application user interface (see operation 618), and to which is added discovery drawer screen devices (see operation 620), which is then sent to an application server 308 (see operation 624) to be stored in one or more locations (see operation 622), for example, in a persistent storage location such as deployment database 331. The application processing module 602 can perform the storing operation of the output application user interface and/or the application server can perform the storing of the output application user interface. In certain cases, the digital application code is stored in its entirety, including the output application user interface, in a persistent storage location accessible to the application server 308.

At some point in time, a user, operating a client device 305, receives an output application user interface (see operation 626), launches the digital application, and begins to interact with the output application user interface (see operation 628), for example, using the discovery drawer screen devices embedded within the output application user interface. Such user interaction precipitates events (see event 630), which event or events may be processed by a display protocol processor 315, to detect a trigger event (see operation 632). In exemplary uses, the occurrence of the trigger event in turn reveals an expandable screen device to display discovery drawer screen device in accordance with the designer's instructions embedded in the application and/or instructions embedded in the application during processing (e.g. during processing after event 630).

Of course the use model 600 is merely one use model, and many other use models are possible and envisioned. For example some aspects of use model 600 can be observed for carrying out a computer-implemented method for providing discovery drawer capabilities (e.g. including trigger-sensitive application help) to a user using a user interface page of a digital application. Specifically, an application server 308 can execute program code for receiving an input application user interface from a designer after the designer has encoded intent or instruction for discovery drawer components within one (or more) of the digital application pages, and having received it, can perform recoding of the input application user interface to produce an output application user interface (e.g. by adding discovery drawer expandable screen devices added to the input user interface description). A client device and/or an application server operating cooperatively can execute a display protocol to detect a trigger event 317, and cause the user interface code running on the client device to expand the expandable screen device to display a notification (e.g. notification 5C02) or other help facilities.

Figure 7:
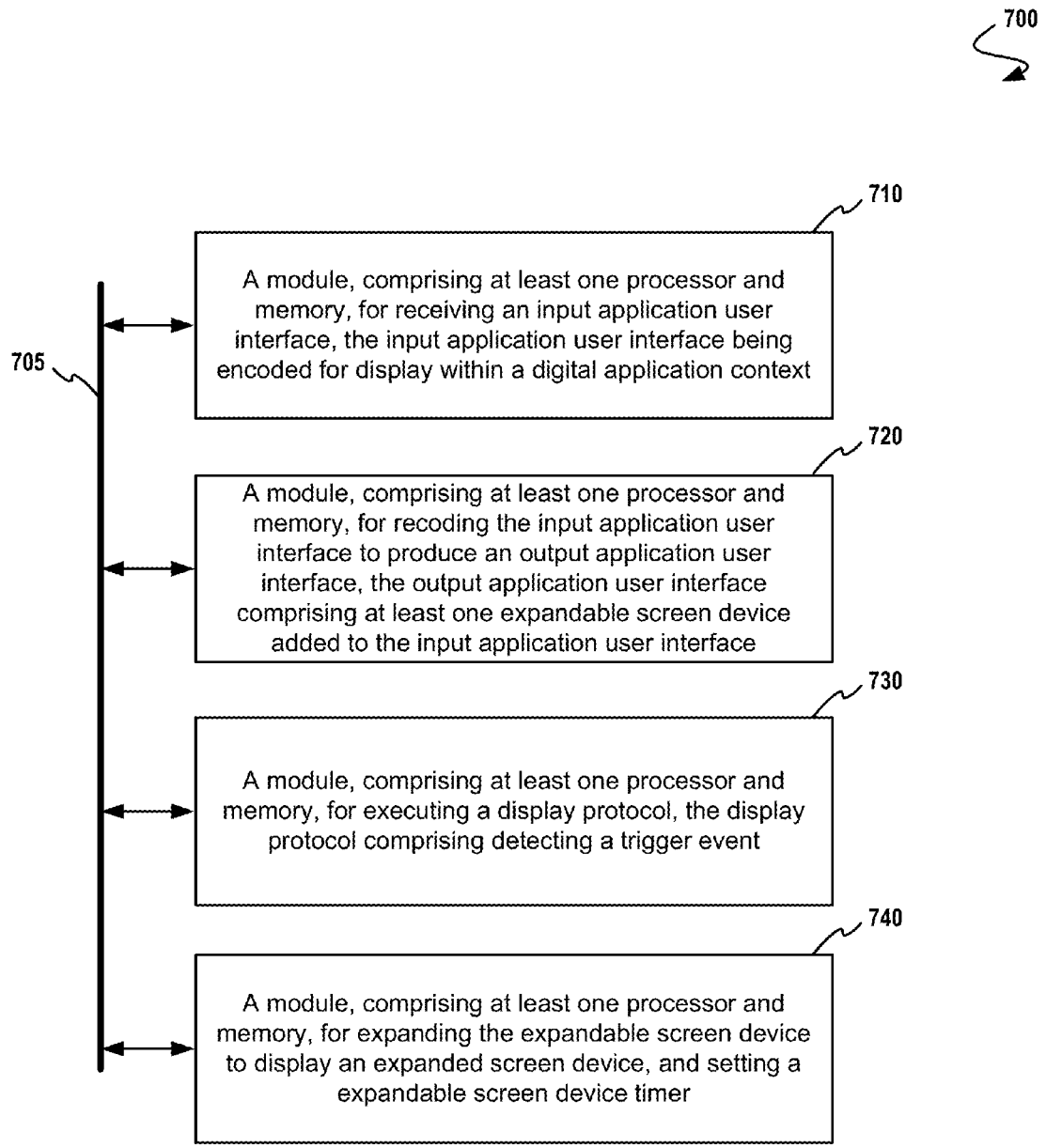
FIG. 7 depicts a block diagram of a system for providing trigger-sensitive application help content to a user using a digital application page, according to one embodiment.

FIG. 7 depicts a block diagram of a system for providing trigger-sensitive application help content to a user using a digital application page. As an option, the present system 700 may be implemented in the context of the architecture and functionality of the embodiments described herein. Of course, however, the system 700 or any operation therein may be carried out in any desired environment. As shown, system 700 comprises a plurality of modules, a module comprising at least one processor and a memory, each connected to a communication link 705, and any module can communicate with other modules over communication link 705. The modules of the system can, individually or in combination, perform method steps within system 700. Any method steps performed within system 700 may be performed in any order unless as may be specified in the claims. As shown, system 700 implements a method for providing trigger-sensitive application help content to a user using a digital application page, the system 700 comprising one or more modules for: receiving an input application user interface, the input application user interface being encoded for display within a digital application context (see module 710); recoding the input application user interface to produce an output application user interface, the output application user interface comprising at least one expandable screen device added to the input application user interface (see module 720); executing a display protocol, the display protocol comprising detecting a trigger event (see module 730); revealing the expandable screen device to display an expanded screen device, and setting an expandable screen device timer (see module 740).

FIG. 8 is a diagrammatic representation of a network 800, including nodes for client computer systems $802_1$ through $802_N$, nodes for server computer systems $804_1$ through $804_N$, and nodes for network infrastructure $806_1$ through $806_N$, any of which nodes may comprise a machine (e.g. computer 850) within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 850) includes a processor 808 (e.g. a processor core, a microprocessor, a computing device, etc), a main memory (e.g. computer memory 810), and a static memory 812, which communicate with each other via a bus 814. The computer 850 may further include a display unit (e.g. computer display 816) that may comprise a touch-screen, or a liquid crystal display (LCD), or a light emitting diode (LED) display, or a cathode ray tube (CRT). As shown, the computer system also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc). The drive unit 822 includes a machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory and/or within the processor 808. The set of instructions 826 may further be transmitted or received via the network interface device 830 over the bus 814.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing information.

While the disclosure has been described with reference to numerous specific details, one of ordinary skill in the art will recognize that the advances can be embodied in other specific forms without departing from the spirit of the disclosure. Thus, one of ordinary skill in the art would understand that the advances are not to be limited by the foregoing illustrative details, but rather is to be defined by the appended claims.

We claim:

1. A computer-implemented method for providing trigger-sensitive application help content relating to new application features to a user using a digital application page, the method comprising:

receiving under-development code comprising an input application user interface, the input application user interface being encoded for display within a digital application context and with encoded intent for application help content, the encoded intent being at least one of an indication or tag relating to new application features identified in the under-development code;

executing program code that complies and recodes the under-development code based on the encoded intent to produce an output application user interface, wherein the recoding includes adding code to the under-development code for at least one expandable screen device that reveals application help content relating to the new application features based on the encoded intent and at least one determined device format for display, adding code to the under-development code for a display protocol comprising detecting a trigger event based on the encoded intent, and adding code to the under-development code for expandable screen device timers that apply uniquely for particular users based on the encoded intent such that the expandable screen device timers assess newness of a particular user relating to the new application features, assess the particular user's learning progress relating to the new application features, and determine when to provide to the particular user additional previously unrevealed application help content relating to the new application features based on one or more progressive revelation techniques; and executing the display protocol, the display protocol comprising setting the expandable screen device timers to apply in accordance with the user in particular, detecting the trigger event, and revealing the expandable screen device to display the expanded screen device embedded within a display of an application work area of the output application user interface without substantially occluding the display of the application work area, wherein detecting the trigger event includes a detection of the user hovering over a new application page feature in a manner defined as one of an unexpected or inefficient user interaction with the new application page feature and a prediction of the user's readiness for application help content to trigger the insertion of the expandable screen device.

2. The method of claim 1, wherein the expandable screen device comprises at least one of a help text area and a user control.

3. The method of claim 1, further comprising:
detecting expiration of an expandable screen device timer; and
minimizing the expandable screen device.

4. The method of claim 1, wherein detecting the trigger event is based on one or more previous states.

5. The method of claim 1, wherein detecting the trigger event is based on one or more states restored from a persistent storage location.

6. The method of claim 1, wherein the detecting the trigger event includes calculating a state progression of user interactions with the digital application page.

7. An advertising server computer for running one or more server applications, the advertising server computer comprising:
one or more processors;
a memory; and
one or more modules executable on the one or more processors according to software instructions stored in the memory such that for received under-development code comprising an input application user interface, the input application user interface being encoded for display within a digital application context and with encoded intent for application help content, and the encoded intent being at least one of an indication or tag relating to new application features identified in the under-development code, the one or more processors are configured to:
execute program code that complies and records the under-development code based on the encoded intent to produce an output application user interface, wherein the recoding includes adding code to the under-development code for at least one expandable screen device that reveals application help content relating to the new application features based on the encoded intent and at least one determined device format for display, adding code to the under-development code for a display protocol comprising detecting a trigger event based on the encoded intent, and adding code to the under-development code for expandable screen device timers that apply uniquely for particular users based on the encoded intent such that the expandable screen device timers assess newness of a particular user relating to the new application features, assess the particular user's learning progress relating to the new application features, and determine when to provide to the particular user additional previously unrevealed application help content relating to the new application features based on one or more progressive revelation techniques; and
execute the display protocol, the display protocol comprising setting the expandable screen device timers to apply in accordance with the user in particular, detecting the trigger event, and revealing the expandable screen device to display the expanded screen device embedded within a display of an application work area of the output application user interface without substantially occluding the display of the application work area, wherein detecting the trigger event includes a detection of the user hovering over a new application page feature in a manner defined as one of an unexpected or inefficient user interaction with the new application page feature and a prediction of the user's readiness for application help content to trigger the insertion of the expandable screen device.

8. The advertising server computer of claim 7, wherein the expandable screen device comprises at least one of a help text area and a user control.

9. The advertising server computer of claim 7, further comprising:
detecting expiration of an expandable screen device timer; and
minimizing the expandable screen device.

10. The advertising server computer of claim 7, wherein detecting the trigger event is based on one or more previous states.

11. The advertising server computer of claim 7, wherein detecting the trigger event is based on one or more states restored from a persistent storage location.

12. The advertising server computer of claim 7, wherein the detecting the trigger event includes calculating a state progression of user interactions with the digital application page.

13. A non-transitory computer readable medium comprising a set of instructions which, when executed by a computer, cause the computer to provide trigger-sensitive application help content relating to new application features to a user using a digital application page, the set of instructions for executing a method comprising:
receiving under-development code comprising an input application user interface, the input application user interface being encoded for display within a digital application context and with encoded intent for application help content, the encoded intent being at least one of an indication or tag relating to new application features identified in the under-development code;
executing program code that complies and records the under-development code based on the encoded intent to produce an output application user interface, wherein the recoding includes adding code to the under-development code for at least one expandable screen device that reveals application help content relating to the new application features based on the encoded intent and at least one determined device format for display, adding code to the under-development code for a display protocol comprising detecting a trigger event based on the encoded intent, and adding code to the under-development code for expandable screen device timers that apply uniquely for particular users based on the encoded intent such that the expandable screen device timers assess newness of a particular user relating to the new application features, assess the particular user's learning progress relating to the new application features, and determine when to provide to the particular user additional previously unrevealed application help content relating to the new application features based on one or more progressive revelation techniques; and
executing the display protocol, the display protocol comprising setting the expandable screen device timers to apply in accordance with the user in particular, detecting the trigger event, and revealing the expandable screen device to display the expanded screen device embedded within a display of an application work area of the output application user interface without substantially occluding the display of the application work area, wherein detecting the trigger event includes a detection of the user hovering over a new application page feature in a manner defined as one of an unexpected or inefficient user interaction with the new application page feature and a prediction of the user's readiness for application help content to trigger the insertion of the expandable screen device.

14. The non-transitory computer readable medium of claim 13, wherein the expandable screen device comprises at least one of a help text area and a user control.

15. The non-transitory computer readable medium of claim 13, further comprising:
detecting expiration of an expandable screen device timer; and
minimizing the expandable screen device.

16. The non-transitory computer readable medium of claim 13, wherein detecting the trigger event is based on one or more previous states.

17. The non-transitory computer readable medium of claim 13, wherein detecting the trigger event is based on one or more states restored from a persistent storage location.

\* \* \* \* \*